United States Patent
Nagel

[19]

[11] Patent Number: 5,941,505
[45] Date of Patent: Aug. 24, 1999

[54] VALVE

[75] Inventor: Heinz M. Nagel, Daun, Germany

[73] Assignee: Arca Regler GmbH, Germany

[21] Appl. No.: 08/646,863

[22] Filed: May 8, 1996

[30] Foreign Application Priority Data

May 9, 1995 [DE] Germany ................. 295 07 639 U

[51] Int. Cl.$^6$ ................................................. F16K 37/00
[52] U.S. Cl. ................. 251/335.2; 137/312; 137/559
[58] Field of Search ............................... 137/559, 312; 251/335.3, 335.2

[56] References Cited

U.S. PATENT DOCUMENTS

| | | | |
|---|---|---|---|
| 2,194,514 | 3/1940 | Buttner | 251/335.2 |
| 2,699,801 | 1/1955 | Schleyer | 137/553 |
| 2,845,084 | 7/1958 | Detlefson | 137/340 |
| 2,983,480 | 5/1961 | Greenlie | 251/335 |
| 3,128,632 | 4/1964 | Green | 74/18.2 |
| 4,694,848 | 9/1987 | Jorgensen et al. | 251/335.2 |
| 5,279,325 | 1/1994 | Kaspers | 137/270 |
| 5,469,774 | 11/1995 | Kaspers | 91/54 |
| 5,474,303 | 12/1995 | Coles | 251/335.2 |
| 5,669,414 | 9/1997 | Miller | 137/312 |

FOREIGN PATENT DOCUMENTS 1215868  11/1959  France .

OTHER PUBLICATIONS

Steril–Regelventil, (Brochure) Author: Armaturen AG von Rohr (German document) 1995.

Primary Examiner—A. Michael Chambers
Attorney, Agent, or Firm—Liniak, Berenato, Longacre & White, LLC

[57] ABSTRACT

A valve (1) has a valve housing (2) traversed by a through-flow channel (3), a valve seat (5) in the through-flow channel (3), and a closure member (13) movable relative to the valve seat (5), wherein the membrane (28) is attached on the outside to the valve housing (2) and on the inside to the closure member (13), whereby a seal (24) is provided on the side of the membrane (28) facing away from the through-flow channel (3) between closure member (13) and valve housing (2), which encloses a support hollow space (29) together with the membrane (28) filled with a non-compressible deformable support medium, wherein the closure member (13) has a shape such that, on the side of the membrane (28) facing away from the through-flow channel (3), the volume of the support hollow space (29) remains essentially constant during movement of the closure member (13).

22 Claims, 2 Drawing Sheets

VALVE

SPECIFICATION

The invention relates to a valve with a through-flow channel traversing a valve housing, a valve seat in the through-flow channel, and a closure member movable relative to the valve seat, wherein a membrane is attached on the outside to the valve housing and on the inside to the closure member.

Such valves are used especially in the processing industry—in the chemical, biochemical, and petrochemical areas, for example. Special value is given in these areas to the sterility of such valves. This is endangered when parts of the valve, for example, the valve rod, protrude out of the valve housing and must be sealed off in this area by means of slide seals.

Known valves of the state of the art have a conventional valve housing with a through-flow channel traversing the housing, wherein the through-flow channel has a valve seat. A closure member movable relative to a valve seat—consisting generally of a valve ball and a valve rod connected thereto—works together with the valve seat so that the volume current can be guided through the valve (compare "STERIPAC"-valves of the firm Rohr Armaturen AG, Muttenz/Switzerland). A ring-shaped membrane is arranged on the seals at the sides of the housing and is seal-tightened on the outside at the housing and on the inside at the closure member. As a result of this seal, the through-flow channel of the valve is easy to sterilize and remains sterile also during operation of the valve, as no disturbing substances can penetrate into the through-flow channel from the outside, that is, through the housing outlet of the valve rod.

If the known valve is used under high pressures, the membrane succumbs to the higher disturbances, as a greater difference pressure acts on it. However, the space on the sides facing the through-flow channel is open, so that eventual leaks can be detected. This, however, is not sufficient for a safe operation of the valve.

The object of the invention is to structure a valve of the kind described above so that it can withstand very high pressures with great reliability.

This object is attained according to the invention in that a seal between closure member and valve housing is arranged on the side of the membrane facing the through-flow channel which, together with the membrane, encloses a support hollow space filled with a non-compressible deformable support medium, whereby the closure member on the side of the membrane facing the through-flow channel is shaped in such a manner that the volume of the support hollow space can remain constant with respect to its structure during the movement of the closure member.

According to the invention, the membrane, which is an advantageous ring membrane, is supported by a support medium, which is an advantageous support fluid on the back, that is, on the side facing the through-flow channel and practically over its entire surface. Because of the non-compressibility of this support medium, the membrane is subjected only to small difference pressures opposite the mechanically moved membranes. The hydraulically supported membrane serves as a seal without being subjected to an additional load. Accordingly, the membrane is protected. The valve can be used at considerably higher pressures than other membranes of this kind and also has a considerably longer service life.

The seal is an advantageously dynamic seal shaped as a soft seal, especially a maintenance-free slide seal. As support fluids, especially for the conveying fluid in the through-flow channel, inert fluids can be used, which are provided with a physiologically harmless lubricant. The membrane can be made of different elastomers—silicon, viton, PTFE, or EPDM, for example.

According to another feature of the invention, a further seal is provided between the closure member and the valve housing on the side facing the support hollow space, wherein both seals enclose a control hollow space. It can be used for leakage control of the seal near the membrane.

To ensure that the volume of the support hollow space remains essentially constant during the movement of the closure member, the closure member should be placed in the region of the support hollow space structured as a differential piston, preferably with a decreasing cross-section in the direction of the membrane. The decreasing cross-section can be realized by a stepping of the differential piston.

In a further embodiment of the invention, the membrane encloses a hollow space system between its attachment areas and preferably at a distance to them. This hollow space system leads to a changed bending characteristic in the membrane which has, as a consequence, the reduction to a minimum of the through-bends in the immediate vicinity of the attachment areas. Sharp crystals that can be composed of aggressive mediums in the vertical construction, and that can be present there eventually, no longer lead to an early closure. The valve has a considerably longer service life.

In an especially preferred embodiment, the hollow space system according to the invention is used for leakage indication. For this purpose, the hollow space system is connected to a leakage-indication apparatus. When the membrane is damaged on the side facing the through-flow channel, the process fluid penetrates into the hollow space system, and this can be indicated by the leakage indication device so it can be seen from the outside. Accordingly, the same takes place when damage to the membrane occurs on the side facing the support hollow space as, in this case, the support medium penetrates and leads to an indication.

The leakage-indication device can be built as a viewing glass connected to the hollow space system. Or, instead, it can also be provided with a hollow space system in pneumatic connection with an upright standing pressure sensor coupled to the leakage indication device. Alternatively, or in combination with this, a standing humidity sensor connected to the hollow space system connected to the leakage indication device can also be used.

For manufacturing the hollow space system, the membrane can be built of two membrane discs lying one over the other at a distance. One of the membrane discs can be indented on the inside and, preferably, the less necessary membrane disc on the side of the support hollow space. For spacing the membrane discs from each other, it is possible to provide gap holders that delimit the hollow space system. Alternatively, or in combination with this, gap holders can also be provided in the hollow space system.

The hollow space system can be shaped as a single hollow space. It can also be made of channels connected to each other that extend, for example, in the periphery direction and/or are star-shaped.

The invention will be explained in more detail with reference to the drawings, wherein.

Figure 1:
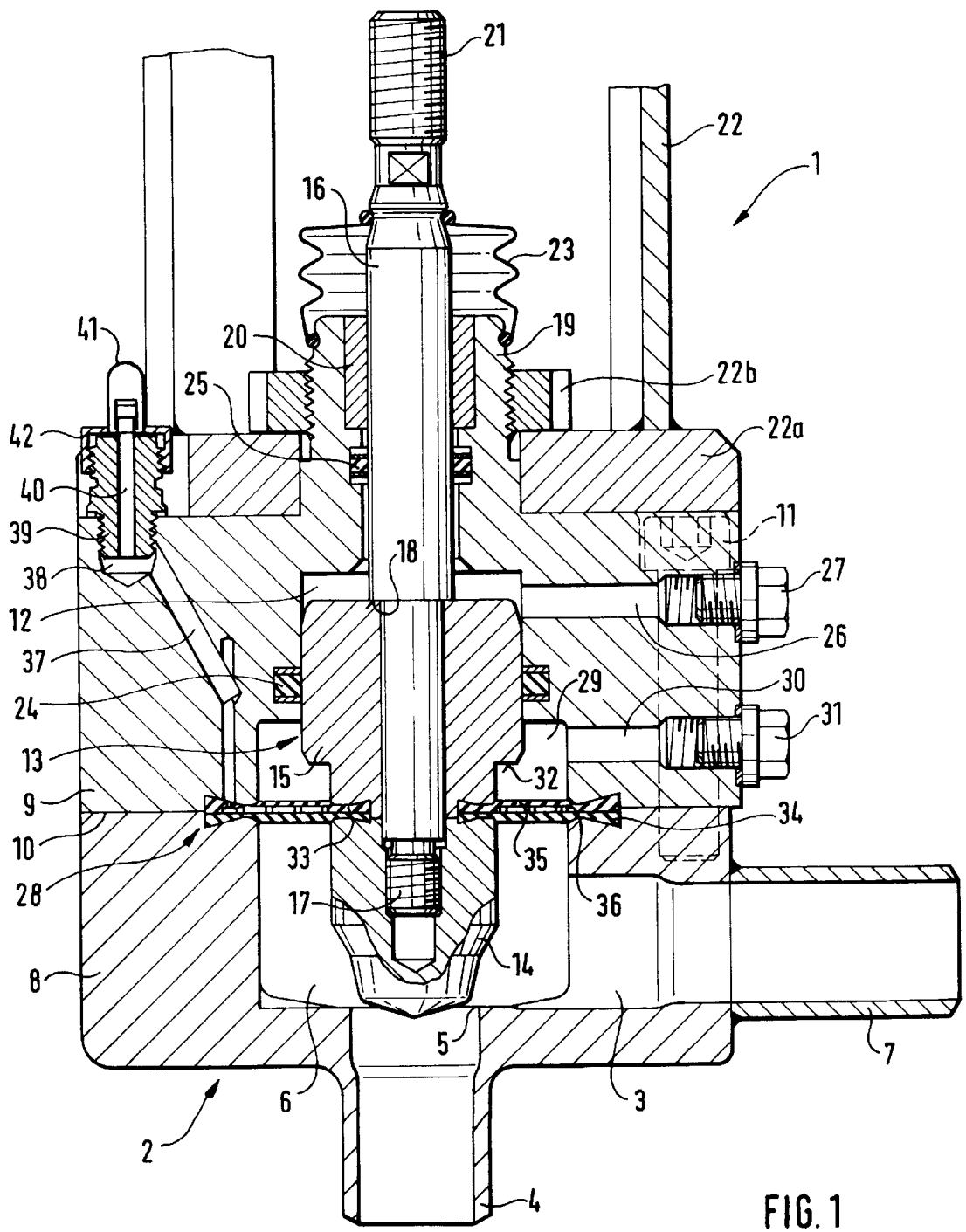
FIG. 1 is a vertical section through the lower part of a valve according to the invention.

The valve 1, which results especially from FIG. 1, has a valve housing 2 that is traversed by a through-flow channel 3. The through-flow channel 3 consists of vertical access supports 4 protruding on the bottom, a valve seat 5, a valve hollow space 6, and discharge supports 7 attached vertically thereto.

The valve housing 2 is divided into a housing lower part 8 and a housing upper part 9, wherein the housing part 8 and the housing part 9 are separated by the separating surface 10 and are connected to each other by means of tension, with several cylinder screws 11 distributed over the periphery. In the housing upper part 9, a cylindrical guide space 12 is placed in a cross-section into which a closure member 13 is inserted.

The closure member 13 has a valve body 14 on the lower part of the valve space 6 protruding into the valve space and has a differential piston 15 arranged over it as well as a valve rod 16. The valve rod 16 reaches up into the valve body 14, and there is screwed on by means of a winding 17 in such a manner that the valve body 14 is tensioned against the differential piston 15 and the latter is tensioned against the heel 18 on the valve rod 16 in the region of the upper end of the differential piston 15. The valve rod 16 traverses a housing neck 19 and there is guided into a guide sleeve 20. The end provided on the outside has the discharge connection 21 by means of which the valve rod 16, for example, can be connected to a membrane drive.

The valve rod 16 is surrounded by a valve yoke 22 welded on a basis plate 22a. This is tensioned against the upper part of the housing part 9 by means of a groove nut 22b. The folded skin 23 protects the discharge of the valve rod 16 coming out of the housing neck 19 against the penetration of impurities.

A ring groove is formed in the wall of the guide space 12 in which a slide seal ring 24 built as a square ring is placed. It lies on the outside of the differential piston 15. A further slide seal ring 25 lies on the outside of the valve rod 16 and is arranged in a ring groove of the housing neck 19. Both slide seal rings 24, 25 close off the guide space 12, which communicates with a control channel 26 barred by a closure screw 27 on the outside. After removal of the closure screw 27, a test can be performed with the control channel 26 to determine if fluid has penetrated into the guide space 12.

The valve space 6 is closed off on the top by a membrane ring 28. The latter is tensely installed seal-tight on the inside between valve body 14 and differential piston 15 as well as on the outside between housing lower part 8 and housing upper part 9. The membrane ring 28 is bendable and elastic so that the vertical mobility of the closure member 13 is practically not influenced by this.

The membrane ring 28 and the lower slide seal ring 24 close off the support hollow space 29, which is completely filled with a non-compressible support fluid. The filling channel 30 is closed off on the outside by a closure screw 31 and belongs also to the support hollow space 29. The support fluid forms a padding against the process fluid that flows through the through-flow channel 3 and impedes the membrane ring 28 from bulging out and being subjected to high-tension demands. Because of this, the valve 1 can also be used in processes with high operation pressures. The support fluid consists preferably of an inert substance that can contain a physiologically harmless lubricant. This ensures a long service life of the lower slide seal ring 24.

The special shape of the differential piston 15 has, as a consequence, the volume of the support hollow space 29 remaining constant during a vertical movement of the closure member 13. For this purpose, the differential piston 15 has a heel 32 where the cross-section of the differential piston 15 to the membrane 28 decreases. During the movement of the closure member 13 in the direction of the opening, which is also upwards, the volume part of the differential piston 15 protruding into the support hollow space 29 is reduced above the heel 18 so that a volume increase occurs in the upper region of the support hollow space 29 corresponding to the volume decrease caused by the lifting up of the membrane ring 28. The displacement effect caused by the introduction of the upper part of the differential piston 15 into the support hollow space 29 by the upward movement of the closure member 13 in the closure direction compensates for the volume increase due to the upward movement of the membrane ring 28.

The membrane ring 28 consists of two parts, that is, it is formed by two membrane discs 33, 34 that lie one over the other and are glued to each other having the same inner and outer diameter. The upper membrane disc 33 is indented in the region between the valve housing 2 and the closure member 13 so that a ring hollow space 35 is formed. The ring hollow space 35 has gap holders—referred to, for example, with numeral 36—so that it is not pressed together under pressure demands. The gap holders can be metal elements or wires.

The ring hollow space 35, in this view, extends left into the attachment area between the housing part 8 and the housing part 9 and, there, is connected to a leakage channel 37. The channel 37 continues through the housing part 9 up to a bag hole 38 into which a leakage screw 39 is screwed. The screw 39 is traversed by a vertical channel 40 connecting with the leakage channel 37, and discharges into a hollow space enclosed by the viewing glass 41. The viewing glass 41 is attached by means of a groove nut 42 on the leakage screw 39.

Figure 2:
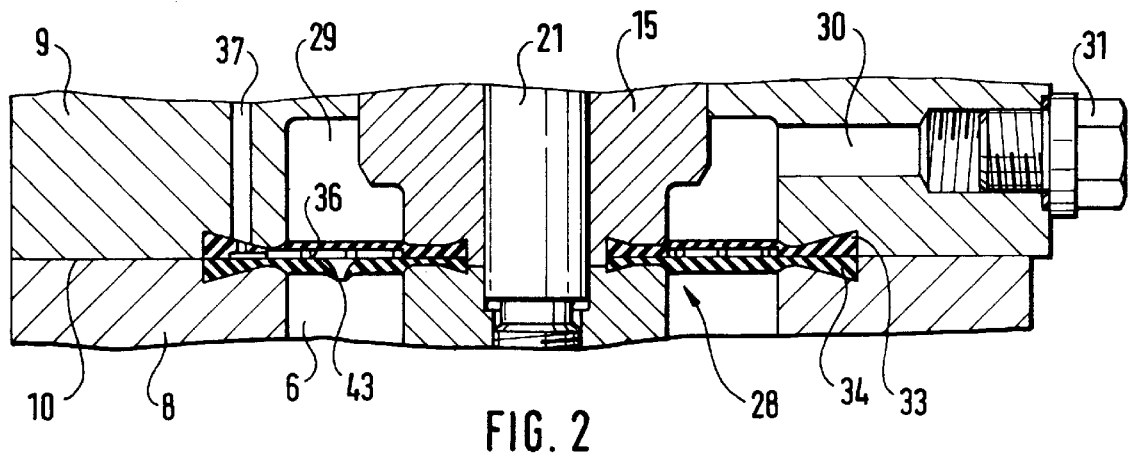
FIG. 2 is a detailed view of the representation according to FIG. 1 with damage to the membrane on the side of the through-flow channel.

In FIG. 2, it is noticeable that the lower membrane disc 34 has a damage 43. Because of this damage 43, the process fluid traversing the through-flow channel 3 penetrates into the ring hollow space 35. It flows through the leakage channel 37, the bag hole 38, and the vertical channel 40 into the hollow space enclosed by the viewing glass 41. In this way, it can also be observed from the outside if the membrane ring 28 is damaged.

Figure 3:
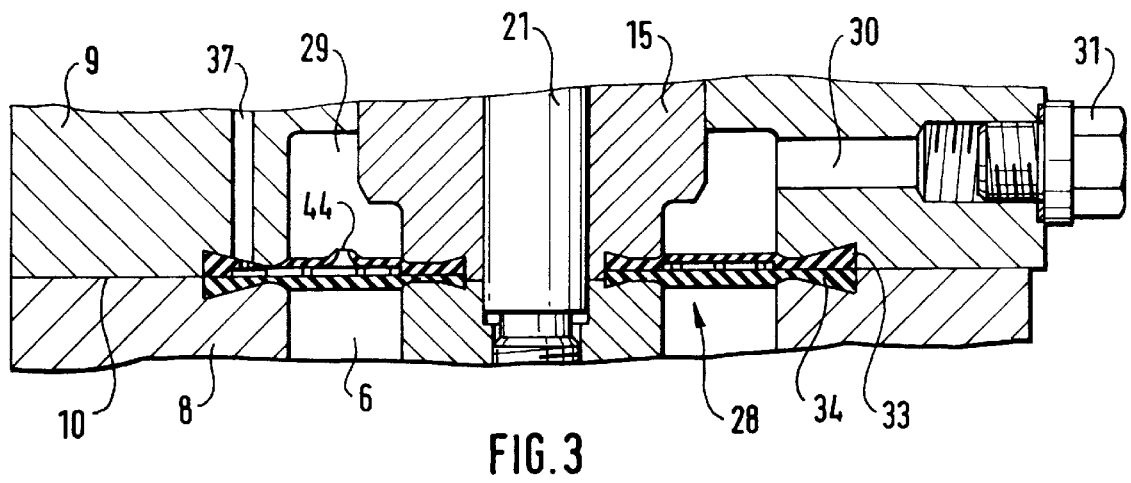
FIG. 3 shows a detailed view according to FIG. 2 with damage of the membrane on the side of the support hollow space.

In FIG. 3, the upper membrane disc 33 has a damage 44. In this case, the support fluid contained in the support hollow space 29 penetrates into the ring hollow space 35 and reaches also up to the hollow space enclosed by the viewing glass 41. If the support fluid has a color different from that of the process fluid, it can be determined by means of the viewing glass not only that there is a damage 43, 44 in the membrane ring 28, but also on which side of the membrane ring 28 the damage is located, that is, if the upper or lower membrane disc 33, 34 is broken.

I claim:

1. A valve, comprising:
   a) a valve housing having a through-flow channel;
   b) a valve seal in said through-flow channel;
   c) a closure member movable relative to said valve seat;
   d) a membrane formed from overlying disks, said membrane having first and second sides attached to said valve housing and said closure member;
   e) a seal disposed adjacent said membrane first side and engaged with said closure member for defining in said housing a closed space;

f) a non-compressible deformable support medium fills said closed space; and g) said closure member is shaped so that the volume of said closed space remains constant during movement of said closure member.

2. The valve of claim 1, wherein said support medium is an inert fluid.

3. Valve (1) with a valve housing (2) traversed by a through-flow channel (3), a valve seat (5) in the through-flow channel (3), and a closure member (13) movable relative to the valve seat (5), wherein a membrane (28) is attached on the outside to the valve housing (2) and on the inside to said closure member (13), characterized in that the side of said membrane (28) facing away from the through-flow channel (3) is provided with a seal (24) between said closure member (13) and said valve housing (2), which, together with said membrane (28), encloses a closed support hollow space (29) filled with a non-compressible deformable support medium, wherein said closure member (13) on the side of said membrane (28) facing away from said through-flow channel (3) is shaped so that the volume of said support hollow space (29) remains essentially constant during movement of said movement of said closure member (13).

4. Valve according to claim 3, characterized in that said seal is a soft seal, especially a slide seal (24).

5. Valve according to claim 3, characterized in that the support medium is a support fluid.

6. Valve according to claim 5, characterized in that said support fluid is provided with a lubricant.

7. Valve according to claim 3, characterized in that said membrane (28) is made from a member selected from the group consisting of elastomers silicon, viton, PTFE, and EPDM.

8. Valve according to claim 3, characterized in that, between said closure member (13) and said valve housing (2) on the side of said seal (24) facing said support hollow space (29), a further seal (25) is provided, whereby both seals (24, 25) enclose a control hollow space (12).

9. Valve according to claim 3, characterized in that said closure member (13) is shaped as a differential piston (15) in the area of said support hollow space (29).

10. Valve according to claim 9, characterized in that said differential piston (15) has a decreasing cross-section when viewed in said direction of the membrane (28).

11. Valve according to claim 10, characterized in that said differential piston (15) is stepped.

12. Valve according to claim 3, characterized in that said membrane (28) encloses a hollow space system (35) between the attachment areas.

13. Valve according to claim 12, characterized in that said hollow space system (35) is at a distance from the attachment areas.

14. Valve according to claim 13, characterized in that the hollow space system (35) is delimited by gap holders on the inside and/or on the outside.

15. Valve according to claim 12, characterized in that said hollow space system (35) is connected to a leakage-indication device.

16. Valve according to claim 15, characterized in that gap holders (36) are provided in said hollow space system (35).

17. Valve according to claim 15, characterized in that said membrane (28) is made up of two membrane discs (33, 34) lying one on top of the other and which are at a distance from said hollow space system (35).

18. Valve according to claim 17, characterized in that one of said two membrane discs (33, 34) is indented on said inside.

19. Valve according to claim 15, characterized in that a humidity sensor is connected to said hollow space system (35) and to said leakage-indication device.

20. Valve according to claim 15, characterized in that said leakage-indication device is shaped as a viewing glass (41) that connects to said hollow space system (35).

21. Valve according to claim 20, characterized in that a pressure sensor is in pneumatic connection with said hollow space system (35) and coupled to said leakage-indication device is provided.

22. Valve according to claim 15, characterized in that said hollow space system (35) is made up of channels that are connected to each other.

* * * * *